United States Patent
Migliorini (10) Patent No.: US 6,495,266 B1
(45) Date of Patent: Dec. 17, 2002

(54) FILMS WITH IMPROVED BLOCKING RESISTANCE AND SURFACE PROPERTIES

(75) Inventor: Robert A. Migliorini, Victor, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/471,959

(22) Filed: Dec. 23, 1999

Related U.S. Application Data (63) Continuation-in-part of application No. 09/439,023, filed on Nov. 12, 1999, now abandoned.

(51) Int. Cl.⁷ .............................................. B32B 27/32
(52) U.S. Cl. ...................... 428/461; 428/409; 428/520; 428/515; 428/516; 428/910; 156/244.1; 264/49; 264/173.14; 264/173.15; 264/173.16
(58) Field of Search ................................ 428/515, 516, 428/520, 409, 461, 910; 156/244.11; 264/49, 173.14, 173.15, 173.16

(56) References Cited

U.S. PATENT DOCUMENTS

| | | | |
|---|---|---|---|
| 4,345,005 A | 8/1982 | All et al. ..................... 428/461 |
| 4,357,383 A | 11/1982 | Howden et al. ............. 428/213 |
| 4,522,887 A | 6/1985 | Koebisu et al. ............. 428/461 |
| 4,604,322 A | 8/1986 | Reid ........................... 428/332 |
| 4,692,380 A | 9/1987 | Reid ........................... 428/349 |
| 4,883,698 A | 11/1989 | Bothe et al. ................ 428/35.9 |
| 5,089,319 A | 2/1992 | Bothe ......................... 428/216 |
| 5,252,384 A | 10/1993 | Bothe et al. ................ 428/212 |
| 5,283,118 A | 2/1994 | Murakami et al. .......... 428/349 |
| 5,326,625 A | 7/1994 | Schuhmann et al. ........ 428/215 |
| 5,364,704 A | 11/1994 | Murschall et al. .......... 428/516 |
| 5,372,882 A | 12/1994 | Peiffer et al. ............... 428/34.9 |
| 5,443,915 A | 8/1995 | Wilkie et al. ............... 428/461 |
| 5,453,466 A | * 9/1995 | Pellegatti et al. ........... 525/240 |
| 5,468,809 A | * 11/1995 | Ghisellini et al. .......... 525/240 |
| 5,491,019 A | 2/1996 | Kuo ............................ 428/213 |
| 5,698,317 A | 12/1997 | Kurokawa et al. .......... 428/349 |
| 5,789,046 A | 8/1998 | Mueller ...................... 428/35.2 |
| 5,849,127 A | 12/1998 | Kuo ........................ 156/244.11 |
| 5,851,640 A | 12/1998 | Schuhmann et al. ........ 428/200 |

FOREIGN PATENT DOCUMENTS

EP          536917 A1    9/1992

* cited by examiner

*Primary Examiner*—D. Lawrence Tarazano
(74) *Attorney, Agent, or Firm*—Rick F. James; Keith A. Bell (57) ABSTRACT

The invention discloses methods of improving blocking resistant properties and reducing the coefficient of friction of a multilayer film comprising providing at least one layer of an ethylene-propylene impact copolymer having from about 3% to about 30% by weight ethylene, wherein said copolymer has no more than two peaks in the melting curve within the range from about 110° C. to about 165° C., and wherein said layer is non-heat sealable, to a multilayer film having a core layer comprising polypropylene, high density polyethylene (HDPE) or linear low density polyethylene (LLDPE), whereby anti-blocking and coefficient of friction characteristics of said film is improved without necessity of adding an antiblock or slip agent.

28 Claims, 5 Drawing Sheets

FILMS WITH IMPROVED BLOCKING RESISTANCE AND SURFACE PROPERTIES

This application claims the benefit of and is a Continuation-in-Part of regular U.S. patent application Ser. No. 09/439,023, filed Nov. 12, 1999, now abandoned.

BACKGROUND OF INVENTION

The invention relates to methods for preparing polymer films. In particular, the invention relates to methods of preparing polymer films with improved blocking resistance and reduced coefficient of friction (COF) without the necessity of adding an antiblock or slip agent.

Two side processable films (i.e. two side treated) allow for diverse functionality. For example, the outside of the film may be metallized, printed or laminated and the inside of the film may have cold seal coating and promotional print. Films which are treated on both sides, either with corona or flame treatment, have been used in the past; however, such films have the tendency to become blocked. This is especially a problem for cavitated films or when one of the surfaces is subsequently metallized since blocking leads to metal pick off and loss of functionality. Blocking manifests itself as, among other things, undesirable adhesion between layers of polymer films. Therefore, such films need to be highly loaded with antiblocks or slip agents to reduce blocking and/or reduce COF.

Antiblocking agents (AB) are additives which are incorporated into the skin layers of films to prevent the surfaces of films from sticking to one another or other surfaces. AB usually are finely divided, solid, infusible materials, such as silica, but can be minerals or waxes. They function by forming minute protruding asperities which maintain separating air spaces so as to interfere with adhesion.

Slip agents are modifiers which act as internal lubricants by exuding to the surface of a polymer film during and after processing; whereby, they lubricate the surface to reduce the COF, and thereby, improve slip characteristics.

It has been standard practice for many years to use AB or slip-agents to reduce the COF of the surface of polypropylene films. Thus, blocking of adjacent layers of film on mill rolls is prevented and film can readily be unwound for use or for further processing. In the absence of the slip agent, the layer-to-layer COF is so great that smooth unwinding of the film is virtually impossible. Typical slip or antiblock agents are high molecular weight fatty acid amides such as stearamide or oleamide. It has become standard practice in the art to incorporate about 0.1 to 1%, preferably 0.2. to 0.5% by weight of such compounds into polyolefin films as slip agents.

However, there are many disadvantages with using antiblocking and slip agents in films. Plate-out, for example, is an objectionable coating of these agents which forms on converting or end-use equipment. Additionally, these agents may scratch the opposite metal layer in a metallized film which could damage the barrier properties of the film. Moreover, these agents may interfere or destroy the adhesion of metal coatings to films.

Accordingly, it is one of the purposes of this invention among others, to produce polymer films with improved blocking resistance and surface properties, by providing an economical and relatively uncomplicated method of making polymer films that imparts superior characteristics to the films, without requirement for additives such as antiblock or slip agents.

SUMMARY OF THE INVENTION

The present invention is a method providing a layer of an ethylene-propylene (EP) impact copolymer, also known as impact modified copolymer, to multilayer films having a core layer of polypropylene, high density polyethylene (HDPE) or linear low density polyethylene (LLDPE), and a product resulting therefrom. The layer of the EP impact copolymer has from about 3% to about 30% by weight ethylene, and is non-heat sealable. The EP impact copolymer has no more than two peaks in the melting curve within the range from about 110° C. to about 165° C. The films may be surface treated on one or both skin layers with flame or Corona treatment. The core layer of these films may be cavitated with a cavitating agent such as polybutylene terephthalate (PBT).

The EP impact copolymer layer can be a skin layer or an intermediate layer of a multilayer film. An intermediate layer can be a tie layer. The EP impact copolymer layer can further include ethylene propylene butylene (EPB) terpolymer or polypropylene or ethylene-propylene random copolymer or propylene butylene propylene copolymer or medium density polyethylene (MDPE) or linear low density polyethylene (LLDPE) or high density polyethylene (HDPE) or blends of the aforementioned polymers.

The film can also include a second skin layer which can include high density polyethylene (HDPE) or ethylene propylene butylene (EPB) terpolymer or ethylene-propylene random copolymer or EP impact copolymer or medium density polyethylene (MDPE) or linear low density polyethylene (LLDPE) or propylene butene copolymer or polypropylene homopolymer or ethylene-vinyl acetate copolymer (EVA) or ethylene-methyacrylic acid copolymer (EMA) or ethylene-vinyl alcohol copolymer (EVOH) or blends of the aforementioned polymers. An intermediate layer can be interposed between the core layer and the second skin layer. Such an intermediate layer can include polypropylene and from about 1% to about 15% by weight titanium dioxide. A second intermediate layer can be interposed between the core layer and the EP block copolymer skin layer, and can include polypropylene.

In the embodiment in which the EP impact copolymer layer is an intermediate layer, it is placed adjacent to a skin layer, e.g., interposed between the core layer and a first skin layer. A second intermediate layer can also be interposed between the core layer and a second skin layer, and can include polypropylene or ethylene-propylene impact copolymer. An intermediate layer can be a tie layer. The skin layers can also include high density polyethylene (HDPE) or ethylene propylene butylene (EPB) terpolymer or ethylene-propylene random copolymer or propylene butylene (PB) copolymer or polypropylene homopolymer or medium density polyethylene (MDPE) or linear low density polyethylene (LLDPE) or blends of the aforementioned polymers.

The present invention provides multilayer films with improved anti-blocking and COF characteristics without the necessity of adding an antiblock or slip agent. This gives the ability to produce sealable clear and cavitated films structures, which are processable on both sides, with outstanding surface properties without the use of additives.

These and other advantages of the present invention will be appreciated from the detailed description and examples which are set forth herein. The detailed description and examples enhance the understanding of the invention, but are not intended to limit the scope of the invention.

BRIEF DESCRIPTION OF THE DRAWINGS

Preferred embodiments of the invention have been chosen for purposes of illustration and description, but are not intended in any way to restrict the scope of the invention.

The preferred embodiments of certain aspects of the invention are shown in the accompanying drawings, wherein.

DETAILED DESCRIPTION OF THE PREFERRED EMBODIMENTS

The present invention provides is a method providing a layer of an ethylene-propylene (EP) impact copolymer to multilayer films having a core layer including polypropylene (PP), high density polyethylene (HDPE) or linear low density polyethylene (LLDPE), and a product resulting therefrom. The multilayer films of the present invention can be monoaxially or biaxially oriented. The copolymer layer is non-heat sealable.

EP impact copolymer includes blocks of propylene and EP copolymer. These copolymers are made by incorporating the rubbery material, ethylene-propylene rubber (EPR), in the reactor with polypropylene. EPR is an elastomer, made by the copolymerization of ethylene and propylene, which typically contains 40–90% ethylene.

The EP impact copolymers utilized in the present invention contain 3–30% ethylene, preferably 7–20%. These impact copolymers have no more than two peaks in the melting curve within the range of from about 110° C. to about 165° C. as measured by a differential scanning calorimeter. Impact copolymer (1) of the present invention has one small peak around 119° C. and a second large peak around 163° C. An example of such an impact copolymer is Montell 8523 EP impact copolymer. This impact copolymer includes blocks of propylene and EP copolymer wherein the total ethylene concentration is 15–20%. Impact copolymer (2) of the present invention has one small peak around 115° C. and a second large peak around 162° C. An example of such an impact copolymer is Fina 4520. The ethylene concentration of this impact copolymer is approximately 10%.

Homopolymer PP is preferred as the PP used as the core layer in the methods of the present invention. One particularly suitable homopolymer PP is the resin sold as Fina 3371. Another suitable homopolymer PP is sold as Amoco 6371.

One particularly suitable HDPE for use as a core layer with the methods of the present invention is the resin sold as M6211 by Equistar. Another particularly suitable HDPE is the resin sold as HDZ128 by Exxon. Other suitable HDPE resins include, for example, BDM 94-25 available from Fina Oil and Chemical Co., Dallas, Tex., and 19C and 19F available from Nova Corporation, Sarnia, Ontario, Canada.

The core layer of the multilayer film can be cavitated. Any suitable organic or inorganic cavitating agent can be used. A preferred organic cavitant is, PBT. An example of an inorganic cavitant is calcium carbonate ($CaCO_3$).

By the methods oft present invention, the antiblocking and COF characteristics of such multilayer films are improved without necessity of adding an antiblock or slip agents; but, these agents can be added if desired.

The multilayer film of the present invention can be surface treated on one or both outermost layers, which are referred to herein as skin layers, with flame or Corona treatment. The usefulness of two-side treated films is that they allow for future processing capability on both sides. Examples of processing includes metallization, printing, lamination and cold seal. Thus, a film can be metallized, printed or laminated on one surface and have cold seal and/or inside print applied to its opposite treated side.

The multilayer film of the present invention can be metallized with the following metals: aluminum, copper, silver, chromium, gold, and mixtures thereof. Aluminum is the substrate that is typically preferred for metallizing.

Suitable coatings for the multilayer film of the present invention can be solvent based, water based or 100% solids based. Examples of suitable coatings are polyvinylidene chloride (PVdC), acrylic, ethylene acrylic acid, polyvinyl alcohol (PVOH), ethylene methyl acrylate (EMA) and acrylonitrile. Blends of these polymers are also suitable as coatings. Examples of acrylic coatings which are particularly suitable are composed of a terpolymer of methyl acrylate, methyl methacrylate, and methyacrylic acid.

Examples of coating application methods that are particularly suitable for applying the above coatings and coating combinations are rod, direct gravure (forward and reverse), offset gravure, slot die, and air knife coating. Coating curing/drying methods can consist of hot air convection, electron beam, ultraviolet, and microwave. The range of acceptable coating weights are 0.1–10.0 g/msi with 3.0 and below g/msi preferred.

Some of the aforementioned coatings can be crosslinked. A primer coating can be used with the aforementioned coatings to enhance adhesion of a coating to a skin layer. Typical primer coating layers are acrylic, styrene acrylic, EAA (ethylene-acrylic acid copolymer), EMA, urethane, epoxy, PEI (polyethyleneimine), polyester, and vinyl amine.

Additives well known in the art such as amorphous silica, wax and talc can be added to the above coatings to improve COF and other surface properties.

The multilayer film of the present invention can also be treated opposite the metallized or coated side to further enhance film functionality with minimal risk of film blocking.

In one embodiment of the present invention the layer of an EP impact copolymer can be a skin layer of a multilayer film. "Skin layer" as used herein means outermost layer of a composite film. When used as a skin layer, the impact copolymer creates a naturally rough surface, even with two-side treated films. The resulting film has a matte surface finish appearance.

In another embodiment of the present invention the layer of EP impact copolymer can be an intermediate layer of a multilayer film. This intermediate layer is placed adjacent to a skin layer. This intermediate layer can be a tie layer. The use of EP impact copolymers as an intermediate layer alters the outer skin layer morphology. The rough texture of the impact copolymer is "transferred" to the skin layer.

The layer of EP impact copolymer can further include ethylene propylene butylene (EPB) terpolymer or polypropylene or ethylene-propylene random copolymer or propylene butylene copolymer or medium density polyethylene (MDPE) or linear low density polyethylene (LLDPE) or high density polyethylene (HDPE) or blends of the aforementioned polymers.

In the embodiment in which the EP impact copolymer layer is a skin layer, the film can further include a second skin layer. Preferably, this second skin layer can include high density polyethylene (HDPE) or ethylene propylene butylene (EPB) terpolymer or ethylene-propylene random copolymer or ethylene-propylene impact copolymer or medium density polyethylene (MDPE) or linear low density polyethylene (LLDPE) or propylene butene copolymer or polypropylene homopolymer or ethylene-vinyl acetate copolymer (EVA) or ethylene-methyacrylic acid copolymer (EMA) or ethylene-vinyl alcohol copolymer (EVOH) or blends of the aforementioned polymers.

A suitable HDPE for use as a skin layer is readily available, e.g., Equistar XM6030A or Exxon HD6704.67. A suitable LLDPE for use as a skin layer is readily available, e.g., Dowlex™ 2038 or Dowlex™ 2027A (The Dow Chemical Company).

In this embodiment an intermediate layer can be preferably interposed between the core layer and the second skin layer. The intermediate layer can include polypropylene and from about 1% to about 15% by weight titanium dioxide. Additionally, a second intermediate layer can be interposed between the core layer and the first skin layer. This second intermediate layer can be interposed between the core layer and the EP impact copolymer skin layer. This second intermediate layer can preferably include polypropylene.

In the embodiment in which the EP impact copolymer layer is an intermediate layer, placed adjacent to a first skin layer, the film can further include a second intermediate layer on the side of the core layer opposite the first intermediate layer. The second intermediate layer can be interposed between the core layer and a second skin layer, and can include polypropylene or ethylene-propylene impact copolymer. The intermediate layers can be tie layers. The skin layers in this embodiment can include high density polyethylene (HDPE) or ethylene propylene butylene (EPB) terpolymer or ethylene-propylene random copolymer or propylene butylene (PB) copolymer or polypropylene homopolymer or medium density polyethylene (MDPE) or linear low density polyethylene (LLDPE) or ethylene-vinyl acetate copolymer (EVA) or ethylene-methyacrylic acid copolymer (EMA) or ethylene-vinyl alcohol copolymer (EVOH) or blends of the aforementioned polymers.

As can be seen from the Examples below, these EP impact copolymer resins outperform (in the context of blocking) traditional EP random copolymers and EPB terpolymer, both containing antiblocking additives. In general, the blocking forces are dramatically reduced when impact copolymer is used either as a skin or intermediate layers. When impact copolymers are used as skin layers, in addition to significantly reducing blocking forces, they provide improved adhesion over homopolymer skins (in terms of cold seal adhesion). When used as intermediate layers, they reduce blocking forces and lower COF. This allows for use of desirable resins (co- or terpolymers) without concerns about blocking and/or high loadings of antiblocks. Therefore, the benefits of random copolymers or terpolymers in terms of sealability can be achieved without the negatives in terms of COF and blocking by using an intermediate layer of impact copolymer under the sealant layer.

Example of a Most Preferred Embodiment

A preferred embodiment of the methods of the instant invention is a biaxially oriented three-layer film structure having two processable sides and an overall thickness of 50 gauge. The film includes the following components: i) a 44.2 gauge homopolymer polypropylene core layer made of Amoco 6371 resin; ii) a 2.3 gauge high density polyethylene (HDPE) skin layer made of Equistar XM6030A resin on one side of the core layer; and iii) a 3.5 gauge EP block copolymer skin layer made of Montell 8523 resin on the other side of the core layer.

The HDPE skin layer is flame treated during orientation and subsequently vacuum metallized to form a metallized layer on the HDPE skin layer. The film utilizes 70 BSMII metallization technology involving vacuum deposition of a 99.88% pure aluminum wire source to form the metallized layer. The metallized layer is formed solely from the wire source. Thus, a resulting metallized layer containing 99.88% by weight aluminum is deposited upon the HDPE layer. The EP block copolymer skin layer is corona treated during orientation to form an unmetallized cold seal (CS) layer opposite the metallized layer. No additives are incorporated into any of the layers aside from a stabilizer and a fluoropolymer which is added to the HDPE layer.

EXAMPLE 1 i. Clear Structures Using Impact Copolymer as a Skin Layer

The film structure used in the following example includes a homopolymer polypropylene or copolymer core layer (B), with a treated EP impact copolymer skin layer (A), and the opposite treated skin layer of HDPE or EPB terpolymer or EP random copolymer (C). The layer (C) opposite the EP impact copolymer can be metallized. Treatment can be flame or corona on both sides.

Data demonstrating the superior blocking resistance of the EP impact copolymer skin layer was generated with a sample roll that was metallized later. The blocking performance as compared to a sample with an EP random copolymer skin layer, produced at the same time, is shown in the Table I. It is clear that the EP impact copolymer provides lower blocking forces when compared to EP random copolymer.

TABLE I

| Treated Skin Opposite the Metal | Blocking Test (g/in) @ 1 hr, 140° F., 750 psi | Actual Blocking Performance When Unwinding Roll |
|---|---|---|
| EP Impact Copolymer | 2.4 | No Blocking |
| EP Random Copolymer + Antiblock Particles | 13.2 | Occasional blocking and metal pick-off |

Additional blocking data of multiple two-side treated films is shown in Table II. The data compares several different skin layers (A) and (C) which were placed in blocking jigs and evaluated at different temperatures, pressures and time. The blocking results for each skin resin type and condition are shown. Once again, the blocking data demonstrates the ability of the EP impact copolymer to release from the opposite treated surface or metallized layer without the use of any antiblocking particulates.

TABLE II

| Skin Layer A | Skin Layer C | Blocking Test (g/in) @ 1 hr, 140° F., 750 psi | Blocking Test (g/in) @ 24 hr, 125° F., 125 psi |
|---|---|---|---|
| EP Impact Copolymer | Aluminum Layer | 4.1 | 0.1 |
| EP Impact Copolymer | HDPE | 23.2 | 2.6 |
| Terpolymer with Antiblock | HDPE | 55.1 | 13.6 |

EXAMPLE 2 ii. Cavitated Structures

The structure of the film used in the example from which the data is generated is shown below. The thickness of the layer is expressed in gauge (ga) which is 0.00001 inch.

| Treated | |
| --- | --- |
| Print Surface - HDPE | 2 ga |
| PP + 4% TiO2 | 10 ga |
| PP + PBT | 51 ga |
| PP | 10 ga |
| Non-print Surface - Variable | 2 ga |

As shown in Table III, different resin types and different additive packages were used to vary the non-print surface. The structure with the impact copolymer skin consistently had the lowest blocking force.

TABLE III

| | | Blocking Conditions | | | |
| --- | --- | --- | --- | --- | --- |
| Variable Print Surface | Non-print Surface | 24 hrs/ 125° F./ 125 psi | 24 hrs/ 100° F./ 125 psi | 72 hrs/ 100° F./ 50 psi | 72 hrs/ 125° F./ 50 psi |
| HDPE | EPB Terpolymer | 168.0 | 51.5 | 20.9 | 88.8 |
| HDPE + silicon spheres | EPB Terpolymer | 129.5 | 58.6 | 28.0 | 77.6 |
| HDPE | PP + AB | 52.3 | 8.5 | 2.8 | 7.8 |
| HDPE | PP + CaCO3 | 12.0 | 3.7 | 2.3 | 3.8 |
| HDPE | Impact copolymer | 3.6 | 1.5 | 0.5 | 1.1 |

The basic film structure from which the data of Table IV is generated is shown below:

| | Treated | |
| --- | --- | --- |
| A | Variable Skin | 4 ga |
| B | PP + Cavitating Agent | 78 ga |
| C | Variable Skin | 4 ga |

Table IV shows the effect the use of impact copolymer as a skin layer has on blocking forces and COF in multilayer films. In each instance, substituting an impact copolymer skin layer for a homopolymer PP or a EPB terpolymer or a HDPE skin layer lowered the blocking force. The effect was greater at the lower pressure.

TABLE IV

| Variable | | Blocking | | TMI Kinetic | |
| --- | --- | --- | --- | --- | --- |
| | | 24 hrs/ 125° F./ | 1 hr/ 140° F./ | COF 200 gr sled/no delay | |
| Surface A | Surface C | 125 psi | 750 psi | A/C | C/C |
| Homopolymer PP + 4% TiO2 | Homopolymer PP + 4% TiO2 | 2.4 | BTD | 0.512 | |
| EPB Terpolymer + 2300 ppm AB | EPB Terpolymer + 2300 ppm AB | 63.3 | 84.1 | 0.813 | |
| HDPE + 1000 ppm AB | EPB Terpolymer + 2300 ppm AB | 32.0 | 70.5 | 0.279 | 0.941 |
| HDPE + 1000 ppm AB | Homopolymer PP + 5400 ppm AB | 2.2 | 79.7 | 0.239 | 0.318 |
| Homopolymer PP + 4% TiO2 | Impact Copolymer (1) | 0.2 | 14.9 | 0.573 | |
| EPB Terpolymer + 2300 ppm AB | Impact Copolymer (1) | 0.7 | 34.8 | 0.544 | |
| HDPE + 1000 ppm AB | Impact Copolymer (1) | 0.3 | 15.1 | 0.254 | |
| Homopolymer PP + 4% TiO2 | Impact Copolymer (2) | 0.0 | 7.7 | 0.551 | |
| EPB Terpolymer + 2300 ppm AB | Impact Copolymer (2) | 1.7 | 58.4 | 0.618 | |
| HDPE + 1000 ppm AB | Impact Copolymer (2) | 0.2 | 10.2 | 0.233 | |
| HDPE + 1000 ppm AB | 70% EPB Terpolymer + 2300 ppm AB/ 30% Impact Copolymer (1) | 11.1 | 18.6 | 0.390 | 0.329 |
| HDPF + 1000 ppm AB | 30% EPB Terpolymer + 2300 ppm AB/ 70% Impact Copolymer (1) | 2.9 | 13.6 | 0.308 | 0.563 |
| HDPE + 1000 ppm AB | 70% Homopolymer PP + 5400 ppm AB/30% Impact Copolymer (1) | 0.8 | 25.4 | 0.237 | 0.423 |
| HDPF + 1000 ppm AB | 30% Homopolymer PP + 5400 ppm AB/70% Impact Copolymer (1) | 0.2 | 12.4 | 0.239 | 0.424 |

Figure 1:
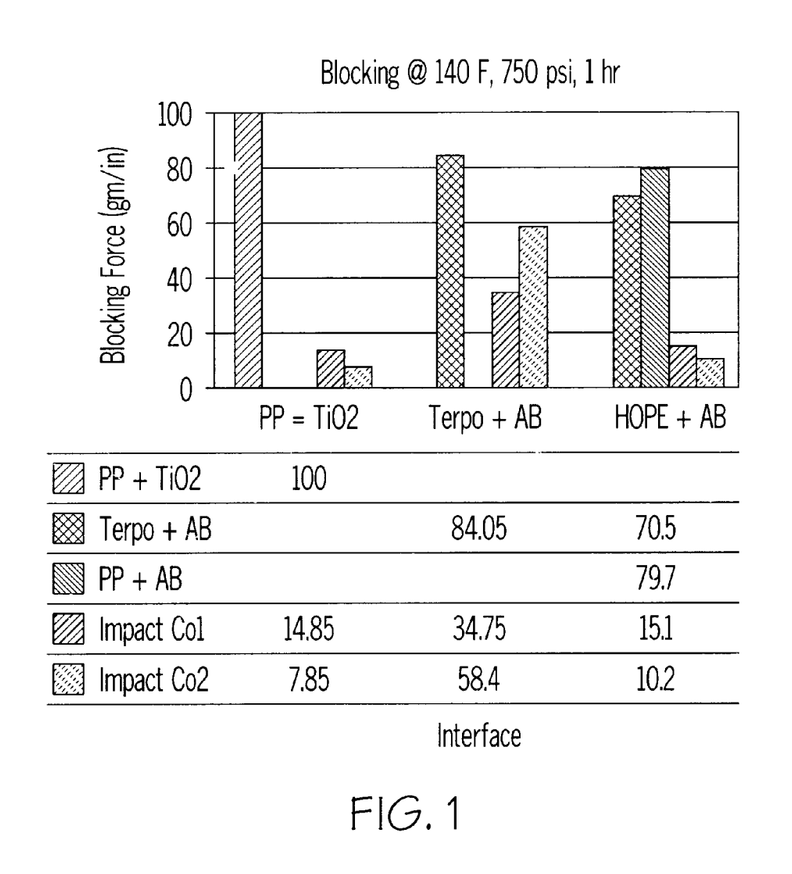
FIG. 1 is a graph showing the effect impact copolymer skin layers have on blocking forces of films. The blocking conditions are 140° F., 750 psi for one hour.
Figure 2:
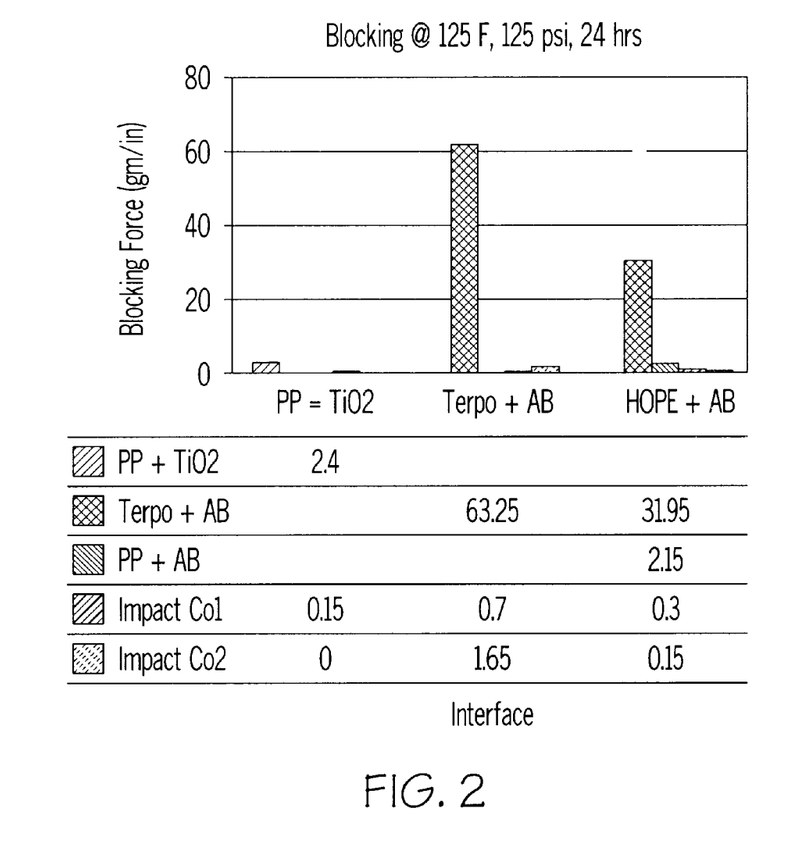
FIG. 2 is a graph showing the effect impact copolymer skin layers have on blocking forces of films. The blocking conditions are 125° F., 125 psi for 24 hours.

FIGS. 1 and 2 show the effect that the using impact copolymer as a skin layer in contrast with using homopolymer polypropylene or terpolymer as a skin layer. The blocking conditions are set at 140° F., 750 psi for one hour and at 125° F., 125 psi for 24 hours. Under both blocking conditions using an impact copolymer skin layer lowered the blocking force. The effect was greater at the lower pressure blocking conditions. [Note: BTD=blocked to destruction.]

Figure 3:
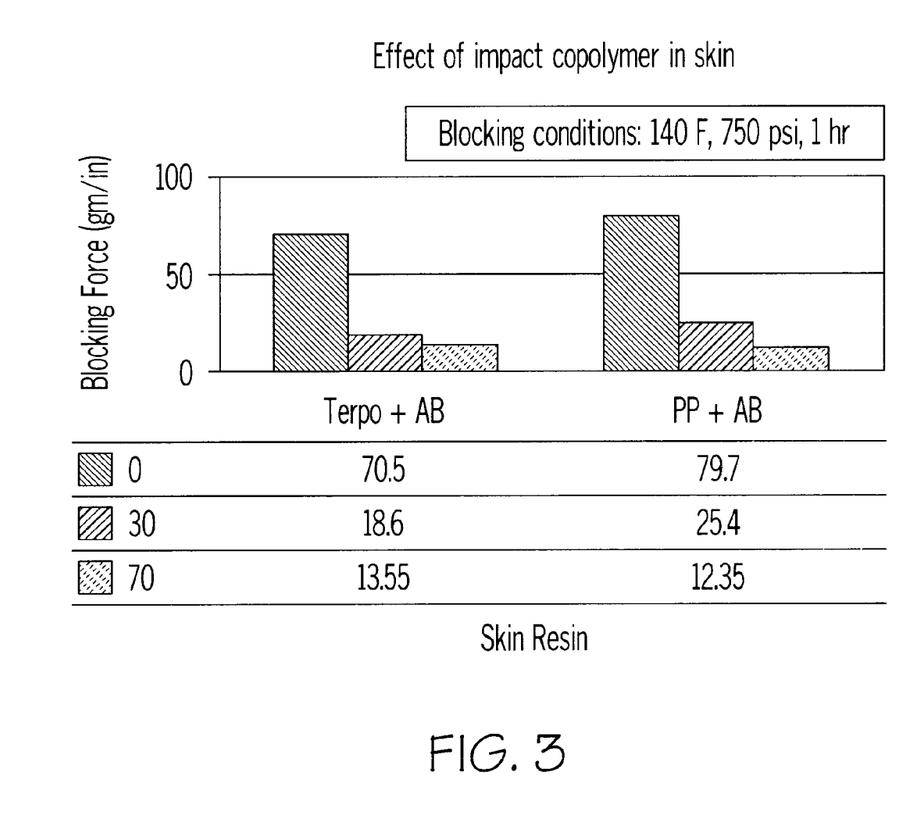
FIG. 3 is a graph showing the effect of blending the impact copolymer of skin layers with terpolymer or homopolymer polypropylene.
Figure 4:
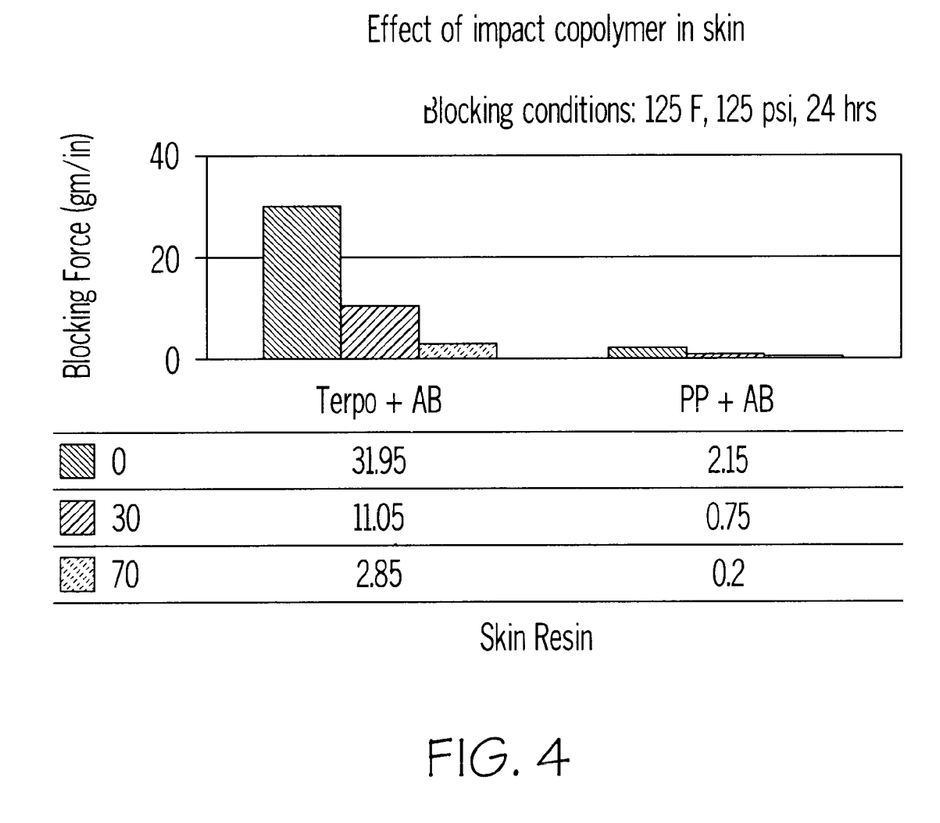
FIG. 4 is a graph showing the effect of blending the impact copolymer of skin layers with terpolymer or homopolymer polypropylene.

FIGS. 3 and 4 show the effect of blending the impact copolymer of the skin layer with terpolymer or homopolymer polypropylene. The second skin layer of these samples is composed of HDPE with 1000 ppm antiblock. All films are two side treated. As the percentage of impact copolymer is increased, the blocking force is decreased. This is especially seen when blending with a terpolymer. The blocking conditions are set at 140° F., 750 psi for one hour.

EXAMPLE 3

Figure 5:
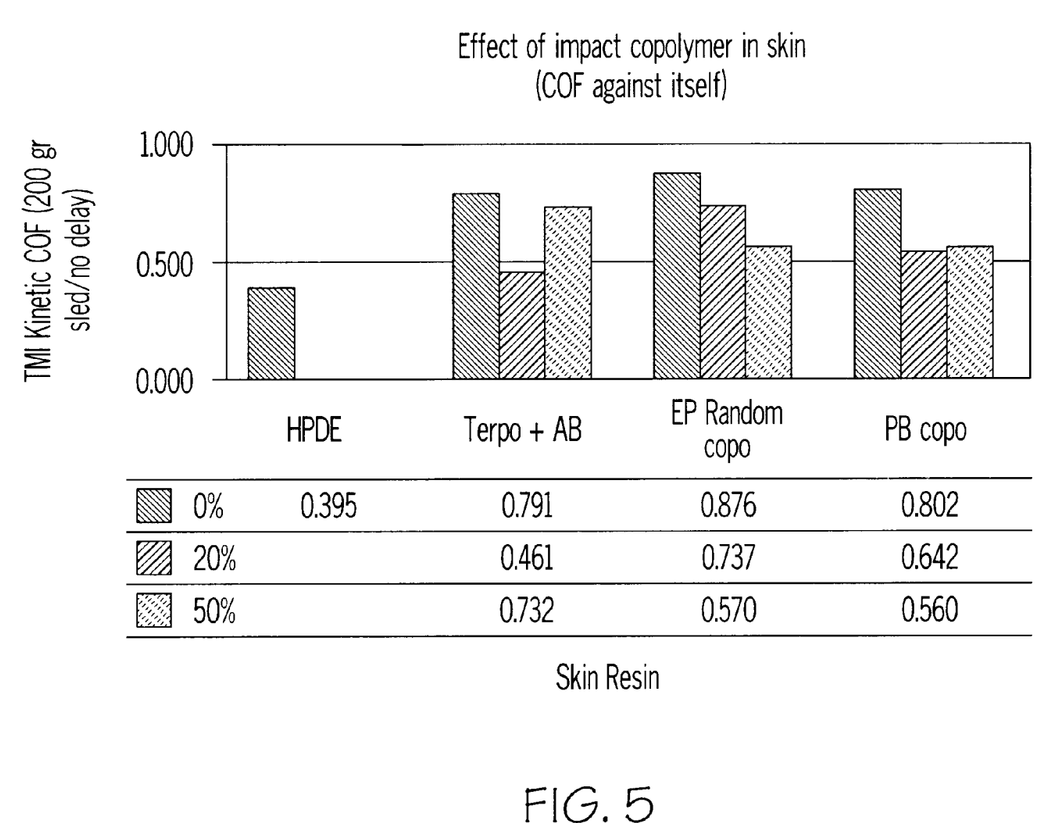
FIG. 5 is a graph showing the effect of impact copolymer which is blended into the treated skin resin.

The structure of the film from which the data in FIG. 5 was generated is shown below:

| | Treated | |
| --- | --- | --- |
| A | Variable Skin | 4 ga |
| B | PP + Cavitating Agent | 78 ga |
| C | EPB Terpolymer + AB | 4 ga |

In this example, the impact copolymer is blended into the treated skin resin. The treated surface was tested against itself. The COF of the samples with impact copolymer layers was lowered without the use of antiblock. The COF at a 50% loading was not always better than the 20% loading, so there may be a point at which the effectiveness diminishes or reverses. FIG. 5 is a graph showing this effect.

EXAMPLE 4

Impact Copolymer Used as a Tie Layer

The structure of the film used to generate the data in Table V is shown below:

| | Treated | |
|---|---|---|
| A | Variable Skin | 4 ga |
| B | Variable Tie | 8–12 ga |
| C | PP + Cavitating Agent | 58 ga |
| B | Variable Tie | 8–12 ga |
| A | Variable Skin | 4 ga |

In these samples, the impact copolymer was used as tie layers. Because the samples were made one side treated only, the treated surface was tested against itself. Both blocking conditions showed reduced blocking force when the tie layers were impact copolymer. The COF of the samples with impact copolymer layers was significantly reduced without the use of antiblock. This effect was particularly dramatic when the skin layer had no antiblock formulated into it. See Table V.

TABLE V

| Variable | | Blocking | | |
|---|---|---|---|---|
| | | 24 hrs/ 125° F./ | 1 hr/ 140° F./ | TMI Kinetic COF 200 gr |
| Skin | Tie | 125 psi | 750 psi | sled/no delay |
| HDPE | Homopolymer PP | 46.5 | 147.4 | 0.476 |
| EPB Terpolymer + AB | Homopolymer PP | 103.3 | 106.1 | 0.724 |
| EPB Terpolymer + AB | Impact Copolymer | 5.5 | 84.7 | 0.501 |
| EP Random Copolymer | Homopolymer PP | 133.7 | 89.3 | 2.367 |
| EP Random Copolymer | Impact Copolymer | 8.1 | 109.1 | 0.559 |
| PB Copolymer | Homopolymer PP | 93.8 | 81.7 | 1.856 |
| PB Copolymer | Impact Copolymer | 7.6 | 76.7 | 0.640 |

The data in Table VI is generated using the film structure shown below:

| | Treated | |
|---|---|---|
| D | Variable Skin | 4 ga |
| C | Variable Tie + TiO$_2$ | 16 ga |
| A | PP + Cavitating Agent | 46 ga |
| B | Variable Tie | 16 ga |
| E | EPB Terpolymer with AB | 4 ga |

In these samples, the impact copolymer is used as the tie layer. One tie layer includes titanium dioxide. Because the sample was made with only one side treated, the treated surface was tested against itself. When the tie layer was impact copolymer, reduced blocking forces were seen under conditions of 125° F./125 psi. The COF of the samples with impact copolymer layers was lowered without the use of antiblock. Again, this effect was particularly dramatic when the skin layer had no antiblock formulated into it. (See Table VI.)

TABLE VI

| Variable | | Blocking 24 hrs/ 125° F./ | TMI Kinetic COF 200 |
|---|---|---|---|
| Skin | Tie | 125 psi | gr sled/no delay |
| HDPE | Homopolymer PP + TiO2 | 36.6 | 0.471 |
| EPB Terpolymer + AB | Homopolymer PP + TiO2 | 64.8 | 0.865 |
| EPB Terpolymer + AB | Impact Copolymer + TiO2 | 55.4 | 0.815 |
| EP Random Copolymer | Homopolymer PP + TiO2 | 87.1 | 1.463 |
| EP Random Copolymer | Impact Copolymer + TiO2 | 29.1 | 0.685 |
| PB Copolymer | Homopolymer PP + TiO2 | 83.7 | 1.621 |
| PB Copolymer | Impact Copolymer + TiO2 | 63.5 | 0.952 |

EXAMPLE 5

This invention provides the use of films containing EP impact copolymer for improved performance after vacuum metallization with aluminum and/or after coating with various solvent based, water based, and solventless coatings.

Two base film designs suitable for vacuum metallizing and coating utilizing an EP impact copolymer are as follows:

Design A—EP Impact Copolymer as a Skin Layer in a 3 to 5 Layer Structure

| Treated |
|---|
| Coating or Metallizing Layer |
| Resins: HDPE, PP homopolymer, EVOH copolymer, EP random copolymer, PB copolymer, EPB terpolymer, MDPE, LLDPE, EVA, EMA or blends of above. Additives: Optional use of antiblock Layer Thickness: 2–16 ga thickness. |
| Optional Tie Layer-Polyolefin based w/optional TiO$_2$-(4–28 ga thickness) |
| Isotactic PP homopolymer, HDPE, or LLDPE (20–100 ga thickness) w/optional addition of cavitating agent |
| Optional Tie Layer-Polyolefin based w/optional TiO$_2$-(4–28 ga thickness) |
| Block Resistant Layer- |
| Resins: EP impact copolymer or blends thereof w/other polyolefins Additives: None Layer Thickness: 2–16 ga thickness |
| Untreated or Treated |

Design B—EP Impact Copolymer as a Tie Layer in a 4 or 5 Layer Structure

| Treated |
|---|
| Coating or Metallizing Layer |
| Resins: HDPE, PP homopolymer, EVOH copolymer, EP random copolymer, PB copolymer, EPB terpolymer, MDPE, LLDPE, EVA, EMA or blends of above |

-continued

Additives: Optional use of antiblock
Layer Thickness: 2–16 ga thickness
Optional Tie Layer Resins: Polyolefin based
Additives: Optional Use of $TiO_2$
Layer Thickness: 4–28 ga thickness
    Isotactic PP homopolymer, HDPE or LLDPE (20–100 ga thickness)
        W/optional addition of cavitating agent Tie Layer Resins: EP impact copolymer or blends thereof w/other polyolefins
Additives: Optional use of $TiO_2$
Layer Thickness: 4–28 ga thickness
Block Resistant Side Resins: HDPE, PP homopolymer, EP random copolymer, PB copolymer,
EPB terpolymer, MDPE, LLDPE or blends of above
Additives: Optional use of antiblock
Layer Thickness: 2–16 ga thickness
        Untreated or Treated

EXAMPLE 6

The film described in the Example of a Most Preferred Embodiment (see above) was vacuum metallized with aluminum to obtain an optical density of 2.4 on the non-EP impact copolymer side of the film. The resulting average barrier properties after metallization are as follows: Water Vapor Transmission Rate (WVTR)=0.015 g/100 in.$^2$/24 hr, Oxygen Transmission Rate (OTR)=2.0 cc/100 in.$^2$/24 hr. This metallized barrier film is particularly suitable for use in triplex laminations and also for use as an inner layer in a duplex lamination. In a duplex lamination, cold seal would be applied to the treated EP impact copolymer surface yielding excellent adhesion.

Data demonstrating the superior blocking resistance of this film was generated with a sample roll that was produced on an experimental line. The blocking performance as compared to another sample with an EP random copolymer skin layer containing antiblock produced at the sa time is shown in the Table VII. The benefits of the EP impact copolymer in terms of film blocking are evident.

TABLE VII

| Treated Skin Opposite the Metal | Blocking Test (g/in) @ 1 hr, 140° F., 750 psi | Actual Blocking Performance When Unwinding Roll |
|---|---|---|
| EP Impact Copolymer | 2.4 | No Blocking |
| EP Random Copolymer + Antiblock Particles | 13.2 | Occasional blocking and metal pick-off |

The base film described in the Example of a Most Preferred Embodiment (see above) was coated with a high barrier saran (Daran 8500 PVdC at 2.6 g/msi ) on the non-EP impact copolymer side of the film (HDPE skin), instead of being metallized. An epoxy primer was applied prior to the saran coating to achieve adequate saran adhesion. The resulting film had an OTR of 0.445 cc/100 in.$^2$/24 hr and a WVTR of 0.18 g/100 in.$^2$/24 hr. This clear barrier film is particularly suitable also for use in triplex laminations and also for use as an inner layer in a duplex lamination. In a duplex lamination, cold seal would be applied to the treated EP impact copolymer surface yielding excellent adhesion. Similarly, the film in this example can be coated on the side opposite the EP impact copolymer with other coatings including acrylic, ethylene acrylic acid, PVOH, EMA and acrylonitrile.

Data displaying the improvement in blocking resistance when using the treated EP impact copolymer opposite the coated side of this film is shown in Table VIII. The control is a treated EP random copolymer surface. Similar to the metallized film, it can be seen that the one side coated films also have improved blocking resistance when the side opposite the coating contains EP impact copolymer.

TABLE VIII

| Treated Skin Opposite Coated Surface | Coating Type | Blocking Test (g/in) @ 24 hr, 125° F., 125 psi |
|---|---|---|
| EP Impact Copolymer | PVdC | 1.5 |
| EP Random Copolymer | PVdC | 6.5 |
| EP Impact Copolymer | PVOH | 0.4 |
| EP Random Copolymer | PVOH | 15.5 |
| EP Impact Copolymer | Acrylic | 4.3 |
| EP Random Copolymer | Acrylic | 68.7 |

We claim:

1. A method of improving blocking resistant properties and reducing the coefficient of friction of a multi layer film comprising:

applying to a core layer of the multi layer film, wherein the core layer comprises a polymer selected from the group consisting of polypropylene, high density polyethylene, and linear low density polyethylene, at least one layer of an ethylene-propylene impact modified copolymer having from about 3% to about 30% by weight ethylene, wherein said impact modified copolymer has no more than two peaks in the melting curve within the range from about 110° C. to about 165° C., and wherein said at least one layer is non-heat sealable.

2. A method according to claim 1 wherein said at least one layer of the multi layer film is a first skin layer.

3. A method according to claim 2 wherein said film is surface treated on at least one skin layer with flame or Corona treatment.

4. A method according to claim 2 wherein said film comprises a second skin layer comprising a polymer selected from the group consisting of high density polyethylene, ethylene propylene butylene terpolymer, ethylene-propylene random copolymer, ethylene-propylene impact modified copolymer, medium density polyethylene, linear low density polyethylene, propylene butene copolymer, polypropylene homopolymer, ethylene-vinyl alcohol copolymer, ethylene-vinyl acetate copolymer, and ethylene-methyacrylic acid copolymer.

5. A method according to claim 4 wherein said at least one layer is placed adjacent to the first skin layer as a tie layer.

6. A method according to claim 1 wherein said core layer is cavitated.

7. A method according to claim 4 which further comprises adding a cavitating agent to said core layer; and interposing an intermediate layer, which comprises polypropylene and from about 1% to about 15% by weight titanium dioxide, between said core layer and said second skin layer; and interposing a second intermediate layer, which comprises polypropylene, between said core layer and said first skin layer.

8. A method according to claim 5 which further comprises:

interposing said tie layer between said core layer and the first skin layer comprising a polymer selected from the group consisting of high density polyethylene, ethylene propylene butylene terpolymer, ethylene-propylene random copolymer, propylene butylene copolymer, polypropylene homopolymer, medium density polyethylene, and linear low density polyethylene, interposing a second tie layer comprising a polymer selected from the group consisting of polypropylene and ethylene-propylene impact modified copolymer, between said core layer and the second skin layer comprising a polymer selected from the group consisting of high density polyethylene, ethylene propylene butylene terpolymer, ethylene-propylene random copolymer, propylene butylene copolymer, polypropylene homopolymer, medium density polyethylene, linear low density polyethylene, ethylene-vinyl alcohol copolymer, ethylene-vinyl acetate copolymer, and ethylene-methyacrylic acid copolymer.

9. A method according to claim 1 which further comprises adding a polymer selected from the group consisting of ethylene propylene butylene terpolymer, polypropylene, ethylene-propylene random copolymer, propylene butylene copolymer, medium density polyethylene linear low density polyethylene, and high density polyethylene to said at least one layer.

10. A multi-layer film with improved blocking resistance and reduced coefficient of friction comprising:

(a) a core layer comprising a polymer selected from the group consisting of polypropylene, high density polyethylene, and linear low density polyethylene, and (b) at least one additional layer comprising an ethylene-propylene impact modified copolymer having from about 3% to about 30% weight ethylene and which has no greater than two peaks in the melting curve within a range of from about 120° C. to about 165° C., said layer being non-heat sealable.

11. A multi-layer film according to claim 10 wherein said at least one additional layer is a first skin layer.

12. A multi-layer film according to claim 11 wherein said film further comprises a second skin layer comprising a polymer selected from the group consisting of ethylene propylene butylene terpolymer, ethylene-propylene random copolymer, medium density polyethylene, linear low density polyethylene, propylene butene copolymer, polypropylene homopolymer, ethylene-vinyl alcohol copolymer, ethylene-vinyl acetate copolymer, and ethylene-methyacrylic acid copolymer.

13. A multi-layer film according to claim 12 which further comprises at least one intermediate layer wherein said at least one intermediate layer is interposed between a skin layer and said core layer.

14. A multi-layer film according to claim 13 wherein said at least one intermediate layer comprises a polyolefin.

15. A multi-layer film according to claim 14 wherein said at least one intermediate layer further comprises titanium dioxide.

16. A multi-layer film according to claim 12 wherein the said second skin layer is metallized or coated.

17. A multi-layer film according to claim 16 wherein the said second skin layer is metallized with a metal selected from the group consisting of aluminum, copper, silver, chromium and gold.

18. A multi-layer film according to claim 16 wherein said second skin layer is coated with a polymer selected from the group consisting of polyvinylidene chloride, acrylic, ethylene acrylic acid, polyvinyl alcohol, ethylene methyl acrylate, and acrylonitrile.

19. A multi-layer film according to claim 10 wherein said at least one additional layer is an intermediate layer and wherein said at least one additional layer is interposed between said core layer and a first skin layer wherein said first skin layer comprises a polymer selected from the group consisting of high density polyethylene, ethylene propylene butylene terpolymer, ethylene-propylene random copolymer, medium density polyethylene, linear low density polyethylene, propylene butene copolymer and polypropylene homopolymer.

20. A multi-layer film according to claim 19 wherein said film further comprises a second skin layer which comprises a polymer selected from the group consisting of ethylene propylene butylene terpolymer, ethylene-propylene random copolymer, medium density polyethylene, linear low density polyethylene, propylene butene copolymer, polypropylene homopolymer, ethylene-vinyl alcohol copolymer, ethylene-vinyl acetate copolymer, ethylene-methyacrylic acid copolymer, and high density polyethylene.

21. A multi-layer film according to claim 20 which further comprises a second intermediate layer comprising a polyolefin interposed between said core layer and said second skin layer.

22. A multi-layer film according to claim 21 wherein the said second skin layer is metallized or coated.

23. A multi-layer film according to claim 22 wherein the said second skin layer is metallized with a metal selected from the group consisting of aluminum, copper, silver, chromium and gold.

24. A multi-layer film according to claimed 22 wherein said second skin layer is coated with a polymer selected from the group consisting of polyvinylidene chloride, acrylic, ethylene acrylic acid, polyvinyl alcohol, ethylene methyl acrylate and acrylonitrile.

25. A multi-layer film according to claim 10 wherein said at least one additional layer is a first skin layer, and wherein said film further comprises a second skin layer comprising high density polyethylene, and wherein said second skin layer is coated.

26. A multi-layer film according to claim 25 which further comprises at least one intermediate layer wherein said at least one intermediate layer is interposed between a skin layer and said core layer.

27. A multi-layer film according to claim 10 wherein said at least one additional layer is a first skin layer, and wherein said film further comprises a second skin layer comprising high density polyethylene, wherein said second skin layer is metallized.

28. A multi-layer film according to claim 27 which further comprises at least one intermediate layer wherein said at least one intermediate layer is interposed between a skin layer and said core layer.

* * * * *